(12) United States Patent
Manroa et al.

(10) Patent No.: US 10,097,540 B2
(45) Date of Patent: *Oct. 9, 2018

(54) CONVENIENT WIFI NETWORK ACCESS USING UNIQUE IDENTIFIER VALUE

(71) Applicant: Time Warner Cable Enterprises LLC, New York, NY (US)

(72) Inventors: Arun Manroa, Herndon, VA (US); Ahmed Bencheikh, Fairfax Station, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 48 days.

This patent is subject to a terminal disclaimer.

(21) Appl. No.: 15/045,579

(22) Filed: Feb. 17, 2016

(65) Prior Publication Data
US 2016/0164864 A1    Jun. 9, 2016

Related U.S. Application Data

(63) Continuation of application No. 13/455,031, filed on Apr. 24, 2012, now Pat. No. 9,288,674.

(51) Int. Cl.
*H04L 29/06* (2006.01)
*H04W 12/08* (2009.01)
*H04W 12/12* (2009.01)
*H04W 84/12* (2009.01)

(52) U.S. Cl.
CPC ...... *H04L 63/0846* (2013.01); *H04L 63/0876* (2013.01); *H04W 12/08* (2013.01); *H04W 12/12* (2013.01); *H04W 84/12* (2013.01)

(58) Field of Classification Search
USPC .......................................................... 726/7
See application file for complete search history.

(56) References Cited

U.S. PATENT DOCUMENTS

| | | | |
|---|---|---|---|
| 2002/0174364 A1 | 11/2002 | Nordman et al. | |
| 2008/0005312 A1* | 1/2008 | Boss | H04L 63/1408 709/224 |
| 2011/0010771 A1* | 1/2011 | Olfat | H04L 63/0892 726/22 |
| 2011/0026455 A1* | 2/2011 | Liu | H04W 76/028 370/328 |

* cited by examiner

*Primary Examiner* — William J. Goodchild
(74) *Attorney, Agent, or Firm* — Chapin IP Law, LLC

(57) ABSTRACT

A WiFi network manager stores a unique identifier value such as a network address associated with a communication device as being a valid credential for the communication device to subsequently access a WiFi network including one or more access points. The WiFi network manager monitors use of the unique identifier value to access the WiFi network. In response to detecting misuse of the unique identifier value by two or more communication devices using the unique identifier value to use the WiFi network, the WiFi network manager at least temporarily prevents access to the WiFi network.

24 Claims, 15 Drawing Sheets

CONVENIENT WIFI NETWORK ACCESS USING UNIQUE IDENTIFIER VALUE

RELATED APPLICATIONS

This application is a continuation of earlier filed U.S. patent application Ser. No. 13/455,031 entitled "CONVENIENT WIFI NETWORK ACCESS USING UNIQUE IDENTIFIER VALUE", filed on Apr. 24, 2012, the entire teachings of which are incorporated herein by this reference.

BACKGROUND

Conventional computer devices typically include a network interface capable of communicating with a WiFi network. For example, according to current technology, to learn of WiFi access points in a region, a computer device transmits a wireless query signal in a region. In response to the wireless signal, any of one or more WiFi network access points in the region respond with information indicating their identities. Accordingly, via the response information from the access points, the operator of the computer device can identify which, if any, WiFi networks are available in a region.

WiFi networks can be openly accessible to any communication device or, alternatively, accessible only by a certain group of subscribers. To access a private WiFi network, a user may be authenticated to verify that the user should be given access to the WiFi network.

One way to authenticate a WiFi user is to request the user to provide a valid password prior to providing the user access to the resources in the WiFi network. For example, a WiFi access point can be configured to challenge a user each time they attempt to use the WiFi network. In response to a challenge, the user provides a password and username. If the password is correct for the username, a user may be provided access to the WiFi network. If the password is incorrect, the user may be denied access to the WiFi network.

Another conventional way of preventing improper use of a WiFi network is use of encryption in which both a client network device and a WiFi access point (e.g., wireless router) encrypt wirelessly transmitted data. In such an instance, a user programs the WiFi access point with one or more appropriate encryption keys. The user also programs each communication device with one or more appropriate encryption keys.

BRIEF DESCRIPTION OF EMBODIMENTS

Conventional applications suffer from a number of deficiencies. For example, configuring a WiFi access point and each network device is typically a difficult task for non-savvy computer users.

Additionally, as mentioned above, as an alternative to encryption, an open WiFi network may require that a subscriber provide a valid password and username each time the user would like to use the WiFi network. Inputting an appropriate password each time a subscriber would like to obtain access to the WiFi network can be tedious, thus diminishing the value of a subscription to the WiFi network.

Programming of a communication device and a base station with encryption keys can require assistance from a sophisticated computer user.

Embodiments herein deviate with respect to conventional techniques. For example, one embodiment herein is directed to providing a subscriber more convenient access to WiFi network resources.

More specifically, according to one embodiment, a WiFi network manager receives a request from a subscriber for access to a WiFi network. The WiFi network may have one or more access points in a particular zone or region of coverage. To facilitate access, the WiFi network can be an open network accessible by the public. In other words, no special encryption key or encoding is required to communicate with the access point.

In response to receiving the request, assuming the user has not yet registered, the WiFi network manager connects the requesting subscriber to a remote resource such as a web portal. Via the web portal, the WiFi network manager receives password information from the subscriber. In addition to receiving password information, the WiFi network manager receives a unique identifier value such as a network address or other suitable resource associated with the communication device to be used by the subscriber to access the WiFi network.

By way of a non-limiting example, the network address can be a MAC (Media Access Control) address assigned to the communication device operated by the subscriber; unique identifier value associated with an application executed on the communication device, etc.

In accordance with one embodiment, the WiFi network manager associates the password information and any other personal information submitted by the subscriber to the unique identifier value associated with the communication device. For example, the WiFi network manager stores the unique identifier value such as a network address as a valid identifier for accessing the WiFi network.

On a subsequent attempt by the subscriber to access the WiFi network via a communication session, the communication device operated by the subscriber forwards the unique identifier value of the communication device to an access point to which the user would like to connect. The access point relays the unique identifier value to the WiFi network manager. The WiFi network manager verifies that no other communication device using the WiFi network is assigned the unique identifier value forwarded by the access point. The WiFi network manager enables the communication device operated by the subscriber access to the WiFi network as long as there are no other users currently use the unique identifier value to access the WiFi network.

Thus, in lieu of having to provide a password that the subscriber is prone to forgetting, embodiments herein include use of the unique identifier value as a basis in which to allow access to the WiFi network. In other words, a network address or other unique identifier value can be used as a credential to use resources associated with the WiFi network.

As mentioned, the WiFi network manager monitors attempts by other communication devices to use the WiFi network based on the unique identifier value associated with the communication device operated by the subscriber. If a second communication device attempting to access the WiFi network uses the same unique identifier value, it is assumed that the network address is being misused. For example, a hacker may have improperly gained access to a network address (e.g., credential to access the WiFi network) and programmed their own communication device with the network address in an attempt to steal WiFi network services.

In response to detecting improper use of the network address to obtain use of the WiFi network at different geographically located access points in the WiFi network, the WiFi network manager prevents an illegitimate user (e.g., user of the second communication device in this example) of the network address access to the WiFi.

In accordance with further embodiments, the WiFi network manager can respond to detecting misuse in accordance with corresponding business rules.

As an example, in one embodiment, in response to detecting misuse of the network address by the second communication device, the WiFi network manager can be configured to prevent use of the WiFi network by the second communication device. As mentioned, it is possible that the user of the second communication device misappropriated use of the network address assigned to the first device.

Additionally, and/or alternatively, according to business rules, the WiFi network manager can challenge the subscriber operating the first communication device to provide password information that was provided during registration. In such an instance, assume the subscriber of the first communication device or second communication device submits the correct password information to the WiFi network manager. Depending on which communication device submits the proper password information associated with the unique identifier value being used as a credential to access the WiFi network, the WiFi network manager can prevent/provide access to the WiFi network.

In this manner, the WiFi network manager can initially provide the subscriber unencumbered access to the WiFi network without requiring additional information that needs to be remembered by the subscriber. Instead, the unique identifier value (i.e., network address) assigned to the communication device serves as a credential enabling access to the WiFi network. Upon detection of misuse of the network address to obtain access to the WiFi network, the WiFi network manager implements measures to determine which user properly uses the network address and which one misappropriated the unique identifier value.

In one embodiment, as an alternative to detecting determining misuse as a result of simultaneous use of the unique identifier value, the WiFi network manager can be configured to determine the misuse based on detecting attempted back-to-back use of the network address by a first communication device and a second communication device to access the WiFi network within a predetermined time.

In accordance with further embodiments, the WiFi network manager can allow use of the unique identifier value to obtain access to the WiFi network for a pre-specified time limit. After the time limit expires, the WiFi network manager can be configured to challenge the subscriber to provide the appropriate password information again. Upon receipt of the proper password information from the subscriber, the time limit can be reset again.

Note that in accordance with yet further embodiments, a unique identifier value can be assigned to a corresponding executable application residing on the communication device. In response to a user initiating execution of the application or a request from the user of the application to establish a communication session with a WiFi network, the application may attempt to locate and establish a connection. When attempting access, the application transmits the unique identifier value to the access point. In a manner as previously discussed, the unique identifier value provided by the executed application can be analyzed by the network manager to determine whether the unique identifier value is a valid credential. If not, the user can register the unique identifier value. Accordingly, the unique identifier value need not be a network address of the communication device.

These and other more specific embodiments are disclosed in more detail below.

Any of the resources as discussed herein can include one or more computerized devices, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware or shortcode in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One embodiment includes a computer readable storage medium and/or system having instructions stored thereon to facilitate distribution of content according to one or more different levels of quality from a server. The instructions, when executed by a processor of a respective computer device, cause the processor or multiple processors of the system to: store a unique identifier value such as a network address as being a valid credential to access a WiFi network including multiple access points; monitor use of the unique identifier value to access the WiFi network; and in response to detecting misuse of the network address to access the WiFi network, at least temporarily prevent a resource that is assigned the unique identifier value from accessing the WiFi network.

Yet another embodiments herein includes a computer readable storage medium and/or system having instructions stored thereon to distribute content from an intermediate distribution node. The instructions, when executed by a processor of a respective computer device, cause the processor or multiple processors of the system to: receive a command from a user to register a communication device with a WiFi network, registration of the communication device with the WiFi network being a pre-condition of using the WiFi network; from the communication device, during the registration, input a network address of the communication device to a gateway resource controlling access to the WiFi network; and subsequent to the registration, receive repeated access to the WiFi network based on submissions of the network address to the gateway resource.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As discussed herein, techniques herein are well suited for use in the field of providing access to one or more WiFi networks. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

According to one embodiment, a WiFi network manager stores a unique identifier value such as a network address associated with a communication device as being a valid credential for the communication device to subsequently access a WiFi network including one or more access points. The WiFi network manager monitors use of the unique identifier value to access the WiFi network. In response to detecting misuse of the unique identifier value by two or more communication devices using the network address to use the WiFi network, the WiFi network manager at least temporarily prevents access to the WiFi network.

Figure 1:
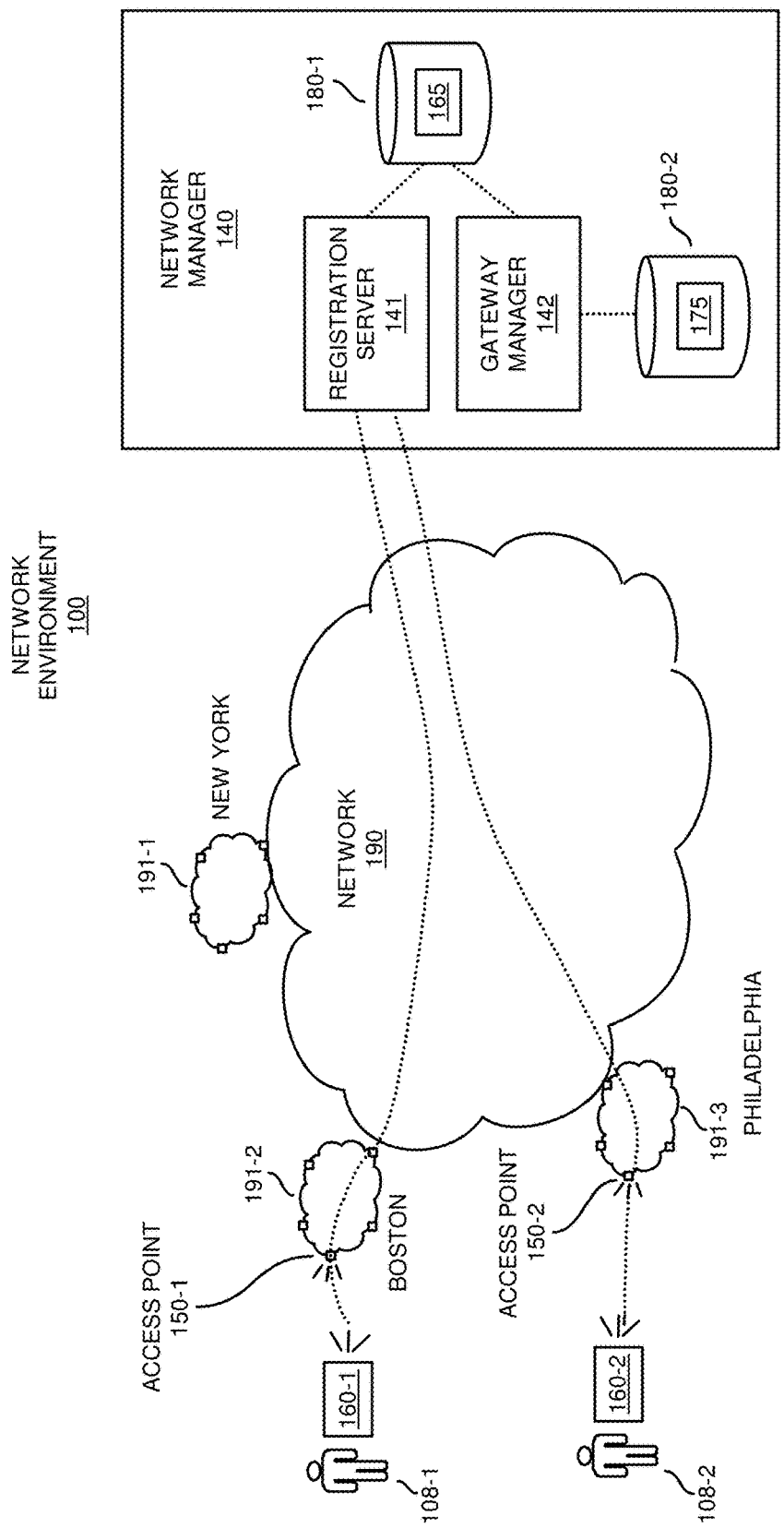
FIG. 1 is an example diagram illustrating a network environment in with which users register to a use a WiFi network according to embodiments herein.

More specifically, FIG. 1 is an example diagram illustrating a network environment in with which users register to use a WiFi network according to embodiments herein.

As shown, communication devices 160 (e.g., communication device 160-1, communication device 160-2, . . . ) resides and roam in network environment 100.

Network environment 100 includes network 190 and network 191. In one embodiment, by way of a non-limiting example, the networks 191 represent WiFi networks available at different geographical locations. For example, network 191-1 can be a WiFi network located in New York; network 191-2 can be a WiFi network located in Boston; network 191-3 can be a WiFi network located in Phildelphia; and so on.

Each network 191 can include one or more WiFi resources such as WiFi access points (e.g., wireless base stations). In accordance with one non-limiting example, the networks 191 support communication based on a suitable wireless protocol such as 802.11 standards or the like.

During operation, networks 191 provide connectivity between one or more communication devices 160 and core network 190. Network 190 can include any suitable wired or wireless network resources (e.g., switches, routers, servers, cellular network, repeater, coaxial cables, . . . ) facilitating distribution and delivery of messages such as data packets or other suitable format from sources to respective destinations. By further way of a non-limiting example, each of the communication devices 160 can be any suitable resource such as a mobile communication device, phone, personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, etc.

Figure 2:
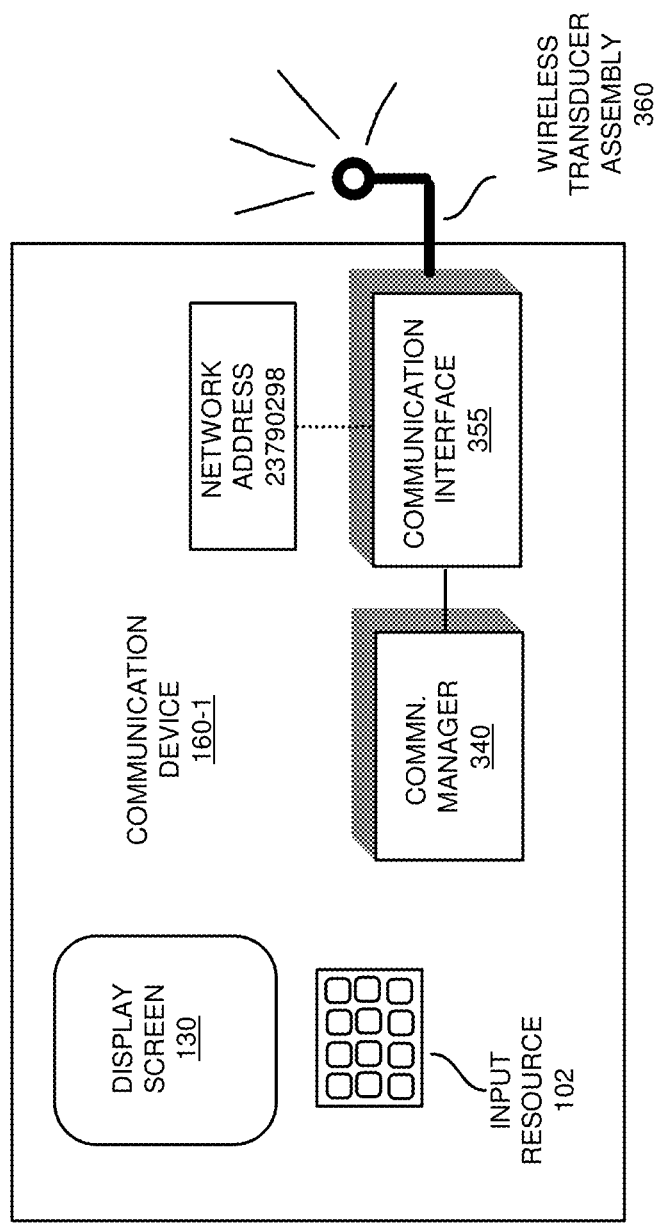
FIG. 2 is an example diagram illustrating a communication device programmed with a unique identifier value according to embodiments herein.

FIG. 2 is an example diagram illustrating of a communication device according to embodiments herein. Each of the communication devices 160 in network environment 100 can include similar features.

As shown, the communication device 160-1 can include a display screen 130, input resource 102, communication manager 340, and communication interface 355. During operation, the user 108-1 can select and open (i.e., execute) an application such as a browser to access network 190.

In one embodiment, the executed application communicates with communication manager 340 and/or communication interface 355 to establish a WiFi connection. In this example, assume that the communication device 160-1 has been assigned network address 23790298. Use of the network address facilitates communications between the communication device 160-1 and remote destinations in the network environment 100. For example, the network address can indicate how to route data traffic.

For example, in accordance with one embodiment, the network address can be used as a way of indicating to other resources in network environment how data is to be transmitted/routed back to the communication device 160-1. Any of one or more data packets transmitted from a respective communication device can include the unique identifier value embedded in the respective data packets to indicate the network address of the source generating the data packets. Packets directed in a reverse direction from resources in network environment 100 can include the network address to indicate the destination to which the data packets are transmitted.

Wireless transducer assembly 360 supports bi-directional wireless communications. For example, wireless transducer assembly 360 supports transmission of wireless signals from the communication device 160-1 to a respective WiFi network 191 in which the communication device 160-1 resides; wireless transducer assembly 360 further supports reception of wireless signals from a respective WiFi network 191 in which the communication device 160-1 resides.

Referring again to FIG. 1, the communication devices 160 may reside at any location and roam within network environment 100. Each WiFi network 191 provides limited wireless coverage in a respective region. In one embodiment, a single access point in a network 191 can provide indoor wireless connectivity between a communication device 160 and the access point up to 50 or more feet; a single access point in a network 191 can provide outdoor wireless connectivity between a communication device 160 and the access point up to 100 or more feet. Of course, the amount of coverage provided by a particular access point can vary depending on how the WiFi networks 191 are configured.

Assume in this example that the user 108-1 operating communication device 160-1 resides in a region of wireless coverage provided by WiFi network 191-2. The communication device 160-1 can learn of the presence of the WiFi network 191-2 based on monitoring the region for one or more wireless signals indicating presence and/or availability of the WiFi network 191-2.

In this example, assume that the user 108 of the communication device 161-1 would like to use the WiFi network 191-2 to obtain access to the Internet. In such an embodiment, the communication device 160-1 transmits one or more wireless signals indicating an attempt to establish a session to communicate with network 190. The WiFi networks 191 in network environment 100 can be open networks. That is, the communication devices 160 can use communicate with the access point 150-1 without securing the data via encryption or other security protocol. Thus, in one embodiment, the WiFi network can be an open network that is at least initially accessible by the public.

Assume in this example that access point 150-1 of WiFi network 191-2 receives a request from communication device 161-2 to establish a WiFi communication session. The initial attempt or request to establish the communication session can include receiving a unique identifier value such as a network address from the communication device 160-1 that is used for data routing purposes. By way of a non-limiting example, the unique identifier value can be a MAC (Media Access Control) address assigned to the communication device 160-1.

In one embodiment, the access point 150-1 forwards the request to establish the communication session over network 190 to the gateway manager 142. The gateway manager 142 determines whether the communication device 160-1 requesting the access is already a subscriber authorized to use WiFi networks 191.

Assume in this example that the user 108-1 and/or communication device 160-1 have not yet been registered. Because the user 108-1 and/or communication device 160-1 have not yet been registered, the access point 150-1 connects the requesting subscriber to a remote resource such as registration server 141 such as a web portal. Via the registration server 141, the WiFi network manager 140 collects information to register the user as a valid subscriber.

A subscriber may be requested to pay a fee to access one or more of WiFi networks 191. Fees can be collected in any suitable manner such as via credit card payment during registration.

Registration server 141 produces and stores registration information 165 in repository 180-1.

Figure 3:
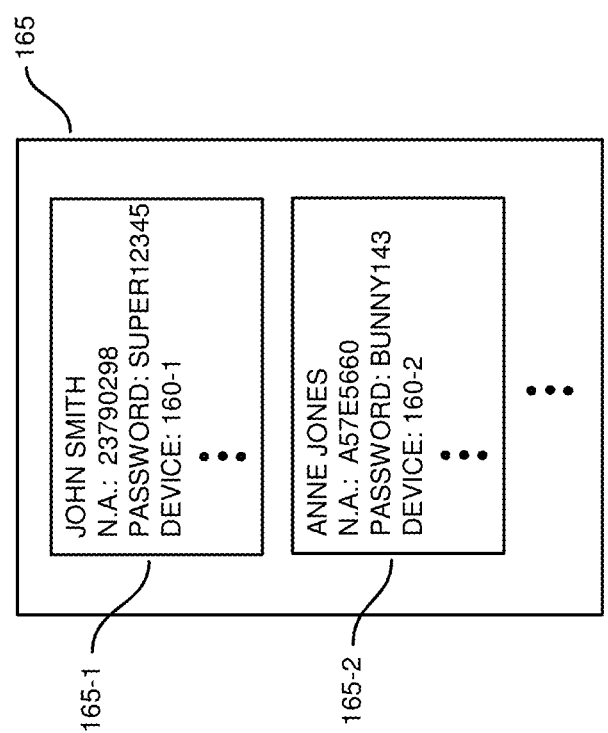
FIG. 3 is an example diagram illustrating storage of subscriber information according to embodiments herein.

FIG. 3 is an example diagram illustrating the different type of information collected and stored by registration server 141 for each of multiple use according to embodiments herein.

In one embodiment, during registration of user 108-1 and/or communication device 160-1, the registration server 141 receives a name of the user 108-1 (e.g., John Smith), a suitable unique identifier value (e.g., a network address assigned to the communication device 160-1 such as 2370298), a password such as SUPER12345, device information, etc.

Thus, in accordance with one embodiment, the network manager 140 produces subscriber information 165-1. Subscriber information 165-1 associates the password information and any other personal information submitted by the user 108-1 to the network address (e.g., 23790298) assigned to the communication device 160-1. For example, the registration server 141 of network manager 140 stores the network address 23790298 as a valid identifier for accessing the WiFi networks 191 in the future.

In one embodiment, during registration of user 108-2 and/or communication device 160-2, the registration server 141 receives a name of the user 108-2 (e.g., Anne Jones), a suitable unique identifier value (e.g., a network address assigned to the communication device 160-2 such as A57E5660), a password such as BUNNY143, device information, etc.

Thus, in accordance with one embodiment, based on information received from user 108-2 during a registration, the network manager 140 produces subscriber information 165-2. Subscriber information 165-2 associates the password information and any other personal information submitted by the user 108-2 to the network address (e.g., A57E5660) assigned to the communication device 160-2. For example, the registration server 141 of network manager 140 stores the network address A57E5660 as a valid identifier for accessing the WiFi networks 191 in the future.

The network manager 140 stores similar information for each subscriber.

As will be discussed later in this specification, the users and/or communication devices 160 will be able to access and use their respective unique identifier value such as a network addresses as a basis to establish additional communication sessions without having to input other credentials as the respective network addresses assigned to the registered communication devices 160 will be sufficient to establish one or more subsequent WiFi communication sessions.

Referring again to FIG. 1, subsequent to registration and payment of appropriate fees, the registration server 141 notifies the access point 150-1 that the user 108-1 and/or communication device 160-1 can use the WiFi network 191.

Recall that the access point 150-1 retrieved the network address associated with the communication device 160-1 during registration. Based on the network address of the communication device 160-1, the access point 150-1 acts as a proxy to transmit and receive data over the network 190 based on the network address assigned to the communication device 160-1.

For example, in one embodiment, the access point receives communications from the communication device over a wireless link established between the access point 150-1 and the communication device 160-1. As a proxy, the access point 150-1 forwards the communications from the communication device 160-1 over network 190. The access point forwards reply communications received over the network 190 to the communication device 160-1 over the established communication link. Thus, during a communication session when there is a wireless link between the communication device 160-1 and the access point 150-1, the user 108 (i.e., subscriber) is able to communicate over network 190.

The respective user 108 can terminate the communication session in a number of ways such as closing an application (such as a browser) that uses the established communication link, roaming outside a region of coverage provided by access points associated with network 191-2, etc.

Figure 4:
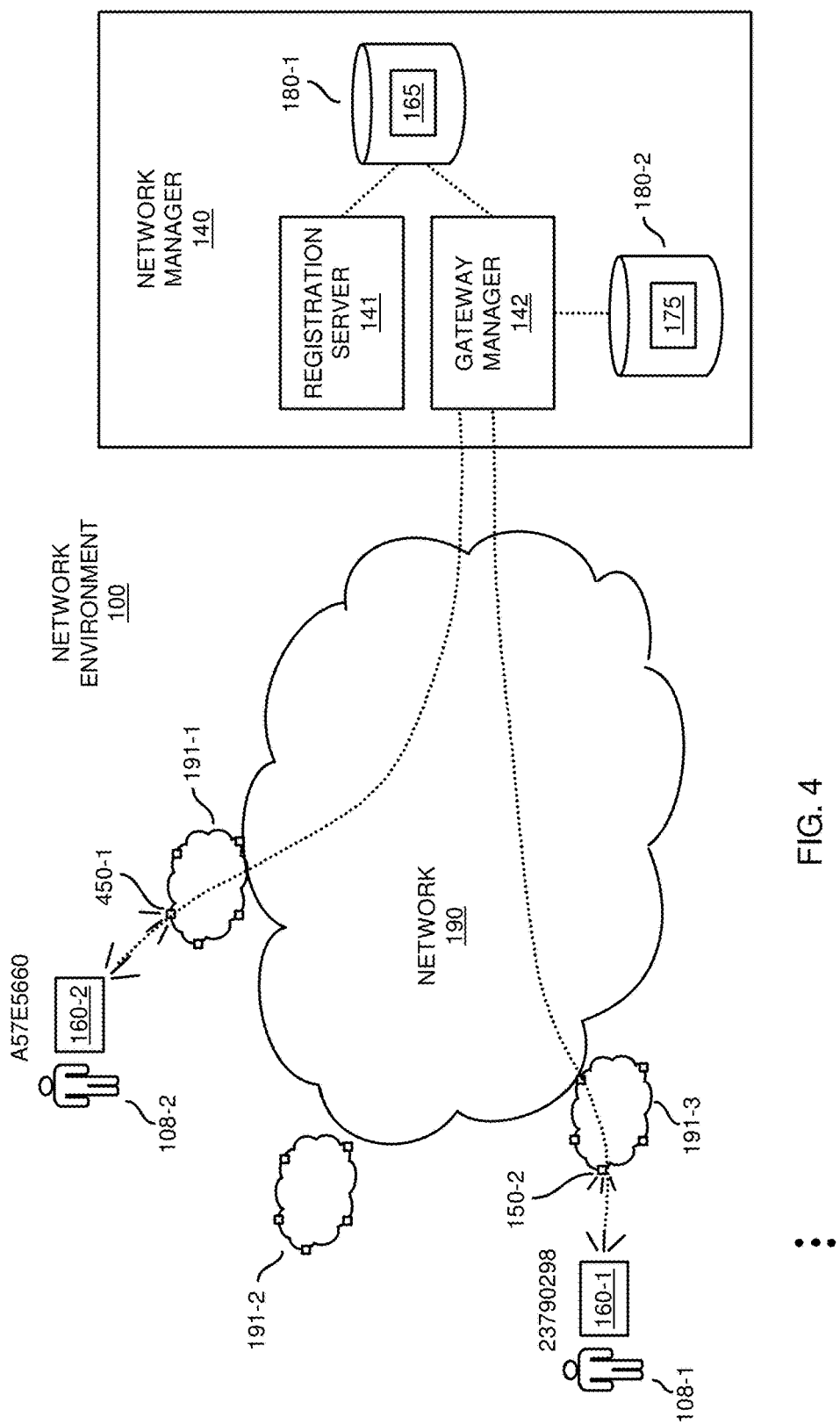
FIG. 4 is an example diagram illustrating a connection manager that selectively provides access to a WiFi network based on submitted unique identifier values according to embodiments herein.

FIG. 4 is an example diagram illustrating use of a unique identifier value such as an assigned network address to establish a communication session with a respective WiFi network according to embodiments herein.

For example, assume in this example, that the user 108-1 roams in the network environment 100 and would like to establish a communication session with WiFi network 191-3 at a new geographical location such as Philadelphia.

In accordance with such an embodiment, the user 108-1 executes an appropriate application on the communication device 160-1. Because the communication device 160-1 resides in a region of wireless coverage provided by access point 150-2, the executed application initiates communications with the access point 150-2 to establish a WiFi communication session in a manner as previously discussed. During the attempt to establish the communication session, the communication device 160-1 transmits the unique identifier value 23790298 to the access point 150-2.

By way of a non-limiting example, the access point 150-2 communicates with gateway manager 142 to determine whether the received unique identifier value 23790298 corresponds to a subscriber that should be provided access to the network 191-3. In other words, the access point 150-2 communicates with the gateway manager 142 to determine whether the communication device 160-1 is authorized to use the network 191-3.

On this attempt by the user 108-1 to re-establish a communication session after registration, the communication device 160-1 operated by the user 108-1 forwards the unique identifier value 23790298 of the communication device 160-1 to the gateway manager 142 of network manager 140.

To determine whether the user 108-1 and/or communication device 160-1 is authorized, the gateway manager 142 can perform one or more functions.

For example, in accordance with one embodiment, the gateway manager 142 analyzes subscriber information 165 stored in repository 180-1 to determine if the user 108-1 and/or communication device 160-1 has previously subscribed to use of services associated with WiFi networks 191. In this example, based on the unique identifier value 23790298 forwarded from the access point 150-2 to the gateway manager 142, the gateway manager 142 determines that the user 108-1 is a subscriber and the communication device 160-1 should be allowed access to the network 191-1.

Prior to notifying the access point 150-2 to provide access to the communication device 160-1, the gateway manager 142 performs an additional check to determine whether any other devices currently using any of networks 191 has been assigned the unique identifier value 23790298. The gateway manager 142 stores network status information 175 in repository 180-2. The network status information 175 can store information such as the unique identifier values associated with each other communication device using WiFi networks 191.

In this example, assume that the gateway manager 142 discovers that no other communication devices currently using any of resources associated with networks 191 have been assigned the network address 23790298. In response to determining such a condition, the gateway manager 142 notifies the access point 150-2 that the access point 150-2 can allow the user 108-1 and/or communication device 160-1 access to the WiFi network 191-3.

Thus, in lieu of the user 108-1 having to perform a tedious task of providing a password or other suitable security information before and/or during establishment of the new communication session, the gateway manager 142 of network manager 140 uses the unique identifier value assigned to the communication device 160-1 t provide access. In one embodiment, the unique identifier value is automatically provided by the communication device 160-1 as a basis in which to allow access to the WiFi network 191-3. In other words, the communication device 160-1, or corresponding application executed thereon, transmits the unique identifier value (such as a network address) so that the access point (or other suitable resource) can act as a proxy to send and retrieve data on behalf of the communication device 160-1.

Figure 5:
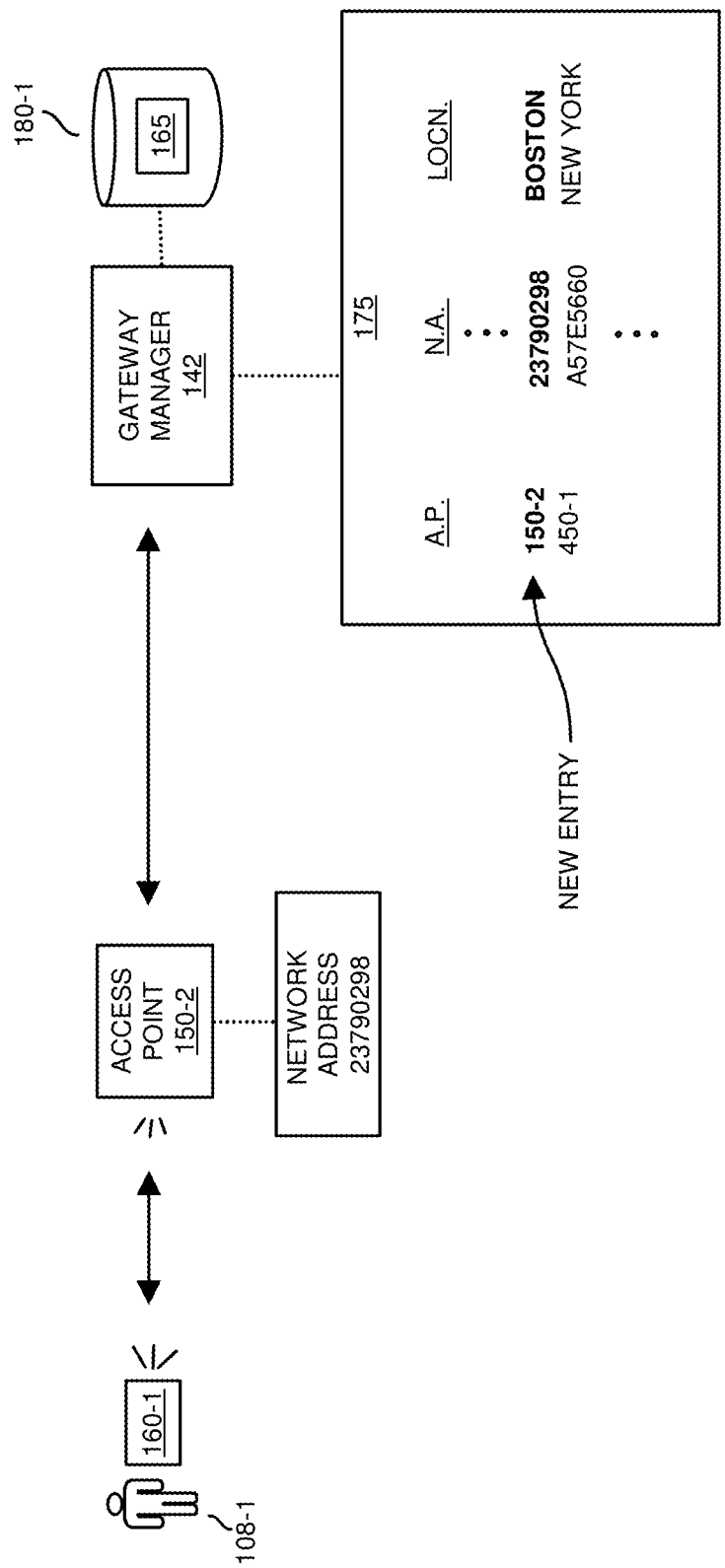
FIG. 5 is an example diagram illustrating verification of a user and/or communication device according to embodiments herein.

FIG. 5 is an example diagram illustrating use of subscriber information and network status information according to embodiments herein.

As mentioned, the access point 150-2 receives the unique identifier value such as network address 23790298 from communication device 160-1. The access point 150-2 communicates with gateway manager 142 to determine whether access should granted to the communication device 160-1 to access the network 190 via network 191-3. Assume in this example that the network address 23790298 corresponds to a valid subscriber as indicated by a lookup in subscriber information 165. In other words, subscriber information 165-1 indicates that the network address 23790298 corresponds to a valid subscriber (i.e., user 108-1 and/or communication device 160-1). Since the network status information 175 does not indicate that another device currently uses the network address 23790298 as looked up in network status information 175, the gateway manager 142 notifies the access point 150-2 to provide WiFi network access to communication device 160-1. Additionally, while the communication session is set up to provide the communication device 160-1 connectivity to network 190 through access point 150-2, the gateway manager 142 stores appropriate information in network status information 175 to indicate that the unique identifier value 23790298 is currently used by a subscriber operating communication device 160-1 to access the network 191.

Upon detecting the communication session between communication device 160-1 and access point 150-2 is terminated, the access point 150-2 provides notification to the gateway manager 142. The gateway manager 142, in turn, updates the network status information 175 to indicate that the communication session has been terminated. The communication device 160-1 is then free to roam the different geographical regions and access an appropriate network 191 at different locations.

Figure 6:
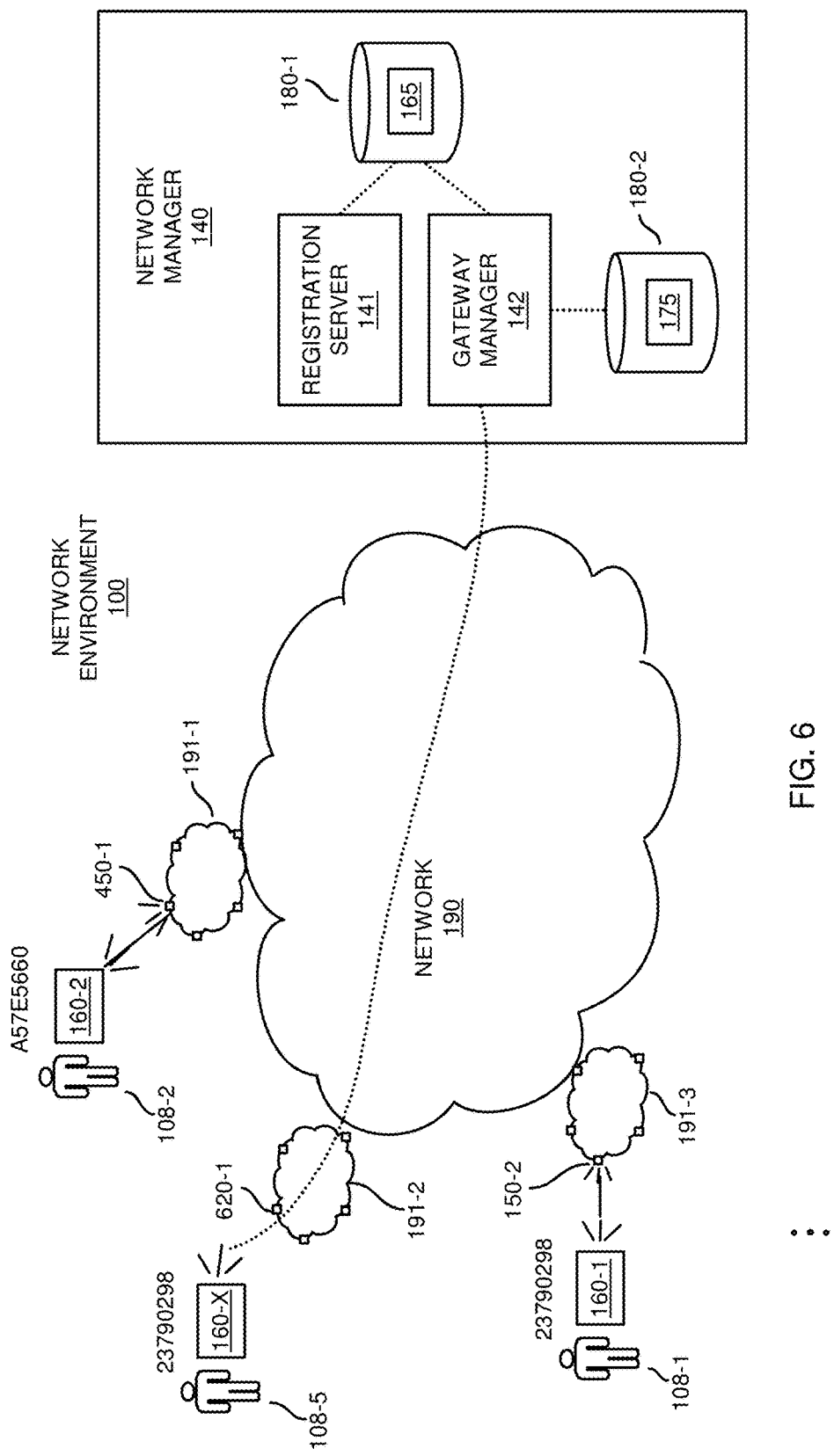
FIG. 6 is an example diagram illustrating denial of multiple communication devices assigned a common network address from using a WiFi network according to embodiments herein.

FIG. 6 is an example diagram illustrating detecting misuse of a unique identifier value according to embodiments herein.

The gateway manager 142 of network manager 140 monitors use of the network 191 for possible fraud. For example, the gateway manager 142 monitors attempts by other communication devices to use the WiFi network based on the unique identifier value associated with the communication device operated by the subscriber.

Assume in this example that the valid user 108-2 uses communication device 160-1 to access network 191-3 as shown. If a second communication device 160-X attempts to access any point in the WiFi network 191 using the same unique identifier value, it is assumed that one or more instances of using the unique identifier value 23790298 is a misuse. More specifically, a hacker (e.g., user 108-5) may have improperly gained access to the unique identifier value 23790298 and programmed their own communication device 160-X with the unique identifier value 23790298 in an attempt to steal WiFi network services.

As previously discussed, the gateway manager 142 keeps track of the different devices that currently use the network 191. As mentioned, this can include keeping track of the different unique identifier values of devices that currently use the network 191.

Assume in this example that the user 108-5 attempts to use network 191-2 while the communication session between communication device 160-1 and network 191-3 is still active. The network status information 175 includes a log of the communication session. Upon receiving a request and unique identifier value 23790298 from the communication device 160-X, the access point 620-1 communicates with gateway manager 142 to determine whether the communication device 160-X should be afforded access to the network 190 through the network 191-2.

Based on a lookup as previously discussed, the gateway manager 142 notes that the unique identifier value 23790298 is a valid credential for network access. However, in this example, because there is an active communication session between the communication device 160-1 and network 191-3 as indicated by mode setting information 175, the gateway manager 142 notifies the access point 620-1 not to provide network access. The gateway manager now is aware that one of the communication devices (e.g., communication device 160-1 or communication device 160-X) improperly uses the unique identifier value 23790298 to gain access to network 191.

In response to detecting improper use of the unique identifier value to obtain use of the WiFi network at different geographically located access points in the WiFi network, the gateway manager 142 (e.g., network manager 140) prevents an illegitimate user (e.g., user 108-5 of the second communication device 160-X in this example) access to the network 191.

In accordance with one embodiment, the WiFi network manager can respond to detecting misuse in accordance with corresponding business rules.

As an example, in one embodiment, in response to detecting the misuse of the unique identifier value 23790298, the gateway manager 142 can be configured to challenge one or both of the users 108-1 and 108-5 to input the appropriate password associated with unique identifier value 23790298. In such an embodiment, the gateway manager 142 notifies access point 620-1 that communication device 160-X may have misappropriated unique identifier value 23790298. The gateway manager 142 notifies access point 150-2 that communication device 160-1 may have misappropriated unique identifier value 23790298.

Each of access points 620-1 and 150-2 temporarily prevents access to all resources in network 191 and challenges a respective user to provide the appropriate password information. Upon receipt of different inputted password information, the access points 620-1 and 150-2 forward the password information to gateway manager 142. Gateway manager 142 analyzes subscriber information 165 to determine that subscriber information 165-2 includes the unique identifier value 23790298. The corresponding password information is SUPER12345. The gateway manager 142 compares the password information received from each communication device 160-1 and 160-X to determine which user provides a value that matches SUPER12345. In this example, assume that user 108-1 provides the appropriate password information SUPER12345 and that user 108-5 does not. That is, user 108-5 provides an incorrect password.

Because the user 108-1 provides the proper password information associated with unique identifier value 23790298, the user 108-1 and communication device 160-1 are able to continue using the network 191-3 to access network 190 and its resources. The user 108-5 is denied access because she did not provide the proper password information.

As mentioned, it is possible that the user 108-5 of the second communication device 160-X misappropriated use of the unique identifier value 23790298 assigned to the first device.

Thus, in the manner as discussed herein, the network manager 140 (e.g., registration server 141 and gateway manager 142) can initially provide a subscriber repeated, unencumbered access to the WiFi network without requiring the subscriber to submit additional and difficult-to-remember information. Instead, as discussed herein, the unique identifier value such as a network address assigned to the communication device serves as a credential enabling access to the WiFi network. Upon detection of misuse of the a unique identifier value to obtain access to the WiFi network, the WiFi network manager implements measures to determine which user properly uses the network address and which one misappropriates use of the network address.

To provide a further measure of security, the network manager 140 can be configured to allow a communication device having a valid unique identifier value to access the resources associated with network 191 at the different geographical locations for a predetermined amount of time before challenging the user to provide the password information. For example, the network manager 140 sets a timer value to indicate that the unique identifier value is valid for use up to 2 months without the network manager 140 performing a challenge to the respective user when connecting to the network 191. After the expiration of the time limit (e.g., 2 months in this example), the network manager 140 challenges the corresponding to provide the appropriate password information on a next attempt to establish a communication session with network 191. This helps to ensure that the unique identifier value is not misappropriated. Upon receiving the appropriate password information after the time limit expires, the subscriber may be afforded another two months of unencumbered use in which the subscriber can establish a communication session based on submission of the appropriate unique identifier value credential.

In one embodiment, as an alternative to determining misuse as a result of simultaneous use by multiple communication devices using the same unique identifier value to access network resources, the network manager 140 and corresponding resources can be configured to determine the misuse based on detecting attempted back-to-back use of the unique identifier value by a first communication device and a second communication device to access the WiFi network within a predetermined time.

Figure 7:
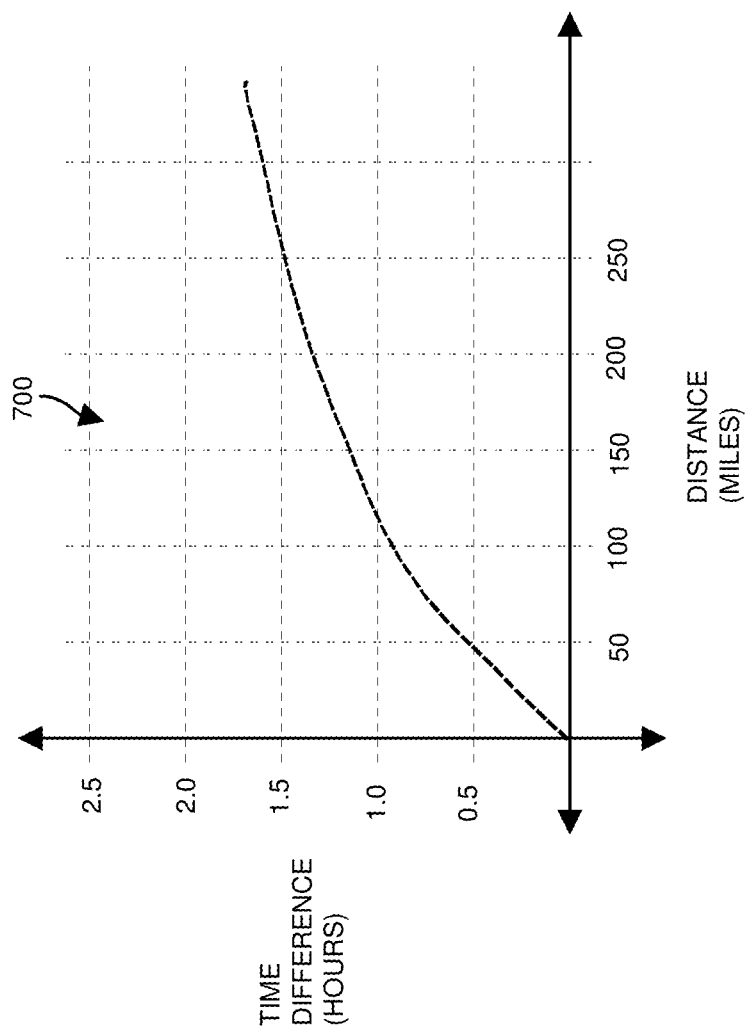
FIG. 7 is an example diagram illustrating is a graph of time versus distance to determine whether a communication device can use the WiFi network at disparate locations according to embodiments herein.

For example, FIG. 7 is an example diagram illustrating is a graph of time versus distance to determine whether a communication device can use the WiFi network at disparate locations according to embodiments herein. The graph 700 illustrates that a valid subscriber cannot establish back-to-back communication sessions with network 191 that are within 50 miles of each other in less than 30 minutes; the graph 700 further indicates that a user is not able to use two different geographically located networks 191 within 250 miles of each other unless a time of greater than 1.5 hours has elapsed, and so on.

Thus, in accordance with graph 700, it is assumed that a subscriber cannot reasonably travel from one geographical location to another in less than a certain amount of time. Thus, if a unique identifier value is used at two different locations within a value as specified by the graph 700, then it is assumed that the unique identifier value is being improperly used to access resources associated with network 191.

Figure 8:
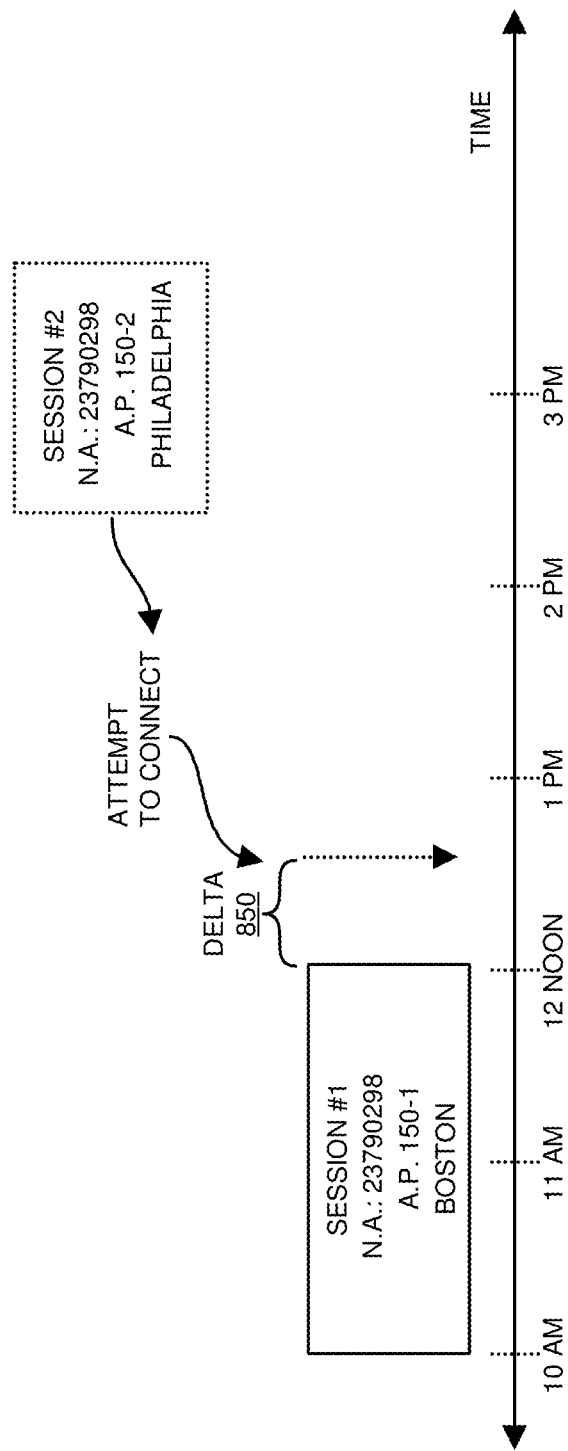
FIG. 8 is an example diagram illustrating a condition in which a communication device is denied use of a WiFi network at multiple disparate access points according to embodiments herein.

FIG. 8 is an example diagram illustrating a condition in which a communication device is denied use of a WiFi network at multiple disparate access points according to embodiments herein. In one embodiment, the network manager 140 logs the different communication sessions over time.

In this example, assume that a communication device submits unique identifier value 23790298 as a valid credential resulting in an established communication session with access point 150-1 (e.g., in Boston) that last between 10 am and 12 noon. After termination of the session #1, assume that a communication device submits unique identifier value 23790298 as a valid credential at 12:30 pm to establish a new communication session with access point 150-2.

In this example, the gateway manager 142 determines a difference in mileage between access point 150-1 (Boston) and access point 150-2 (Philadelphia). Assume that the distance is 250 miles. The gateway manager 142 uses graph 700 to map 250 miles to a value of 1.5 hours. The delta time 850 in this example between communication sessions is 0.5 hours. A subscriber could not be located in Boston at 12 pm and subsequently reside at location within 0.5 hours. Since delta time 850 (i.e., 0.5 hours) is less than the time value of 1.5 hours, the attempted communication session at 12:30 pm is denied.

Figure 9:
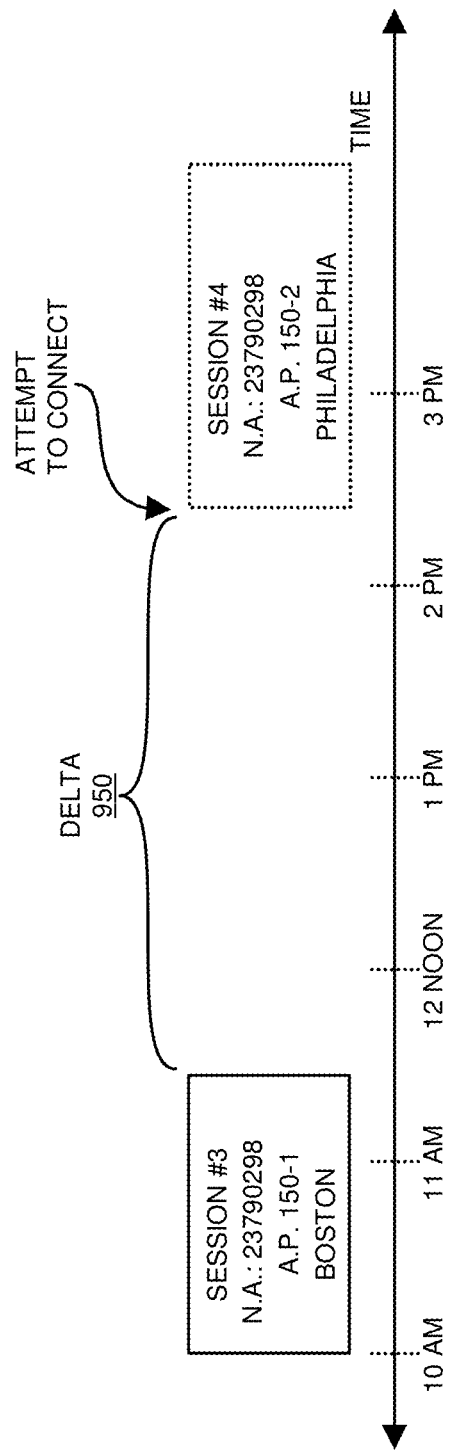
FIG. 9 is an example diagram illustrating a condition in which a communication device is granted use of a WiFi network at multiple disparate access points according to embodiments herein.

FIG. 9 is an example diagram illustrating a condition in which a communication device is granted use of a WiFi network at multiple disparate access points according to embodiments herein.

In this example, assume that a communication device submits unique identifier value 23790298 as a valid credential resulting in an established communication session #3 with access point 150-1 (e.g., in Boston) that last between 10 am and 11:30 am. Assume that a communication device submits unique identifier value 23790298 as a valid credential at 2:30 pm to establish a communication session #4 with access point 150-2 (e.g., in Philadelphia).

In this example, the gateway manager 142 determines a difference in mileage between access point 150-1 (Boston) and access point 150-2 (Philadelphia). Assume that the distance is 250 miles. The gateway manager 142 uses graph 700 to map 250 miles to a value of 1.5 hours. The delta time 950 in this example between communication sessions is 3.0 hours. A subscriber could be located in Boston at 11:30 pm and subsequently reside at the Philadelphia location within 3.0 hours. Since delta time 950 (i.e., 3.0 hours) is greater than less than the delta time value 950 of 1.5 hours, the attempted communication session at 2:30 pm is granted.

Figure 10:
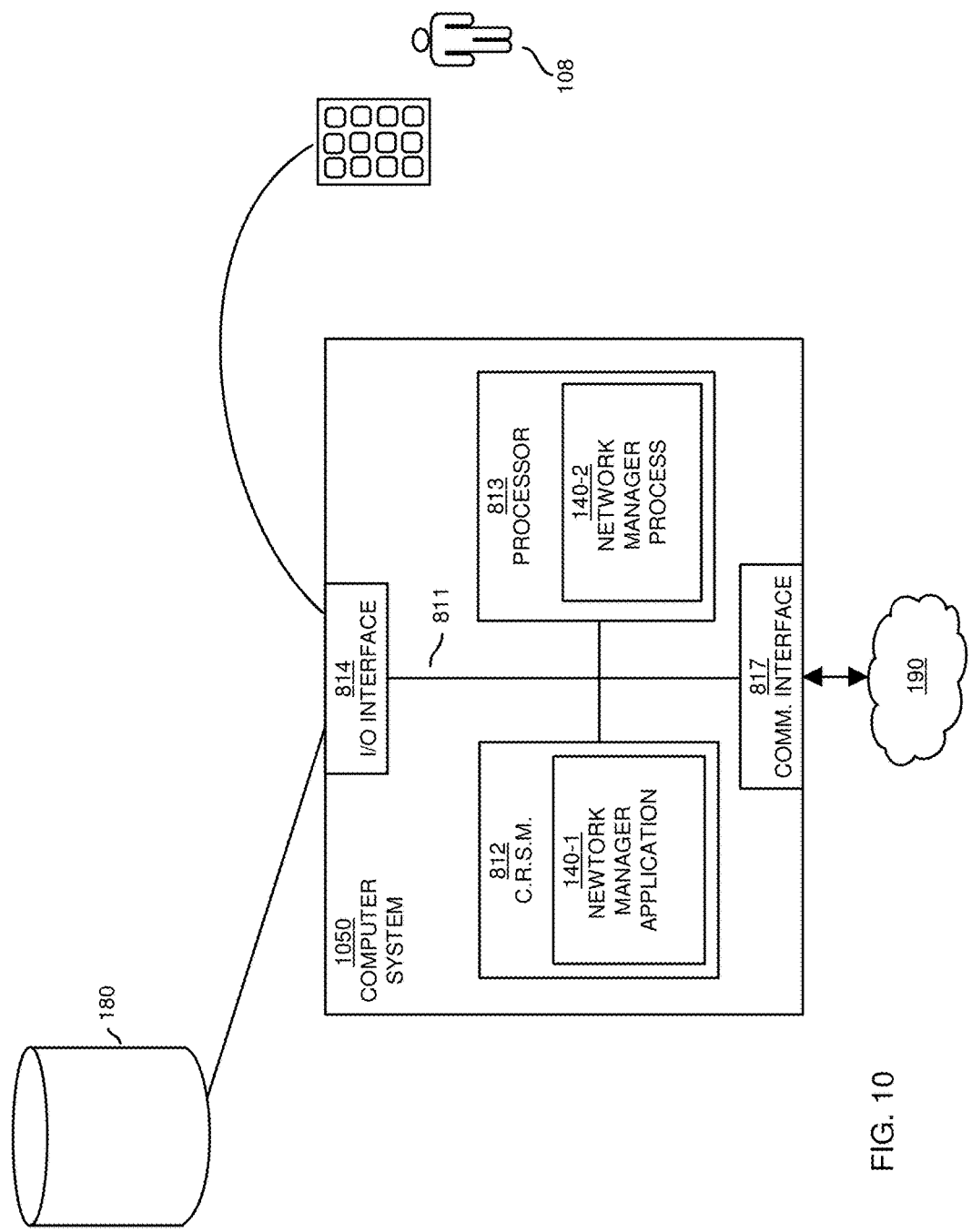
FIG. 10 is an example diagram illustrating a computer architecture in which to execute one or more embodiments as discussed herein.

FIG. 10 is an example block diagram of a computer system for implementing any of the operations as discussed herein according to embodiments herein.

As shown, computer system 1050 of the present example can include an interconnect 811 that couples computer readable storage media 812 such as a non-transitory type of hardware storage media (i.e., any type of hardware storage medium) in which digital information can be stored and retrieved, a processor 813, I/O interface 814, and a communications interface 817.

I/O interface 814 provides connectivity to a repository 180 and, if present, other devices such as a playback device, keypad, a computer mouse, etc.

Computer readable storage medium 812 can be any hardware storage device such as memory, optical storage, hard drive, floppy disk, etc., in which to store data or information. In one embodiment, the computer readable storage medium 812 stores instructions and/or data as discussed herein.

Communications interface 817 enables the computer system 1050 and processor 813 (e.g., processor device) to communicate over a resource such as network 190 to retrieve information from remote sources and communicate with other computers. I/O interface 814 enables processor 813 to retrieve stored information from repository 180.

As shown, computer readable storage media 812 is encoded with network manager application 140-1 (e.g., any suitable software, firmware, etc.) executed by processor 813. Network manager application 140-1 can be configured to include instructions to implement any of the operations as discussed herein.

During operation of one embodiment, processor 813 accesses computer readable storage media 812 via the use of interconnect 811 in order to launch, run, execute, interpret or otherwise perform the instructions in network manager application 140-1 stored on computer readable storage medium 812.

Execution of the network manager application 140-1 produces processing functionality such as network manager process 140-2 in processor 813. In other words, the network manager process 140-2 associated with processor 813 represents one or more aspects of executing network manager application 140-1 within or upon the processor 813 in the computer system 150.

Those skilled in the art will understand that the computer system 150 can include other processes and/or software and hardware components, such as an operating system that controls allocation and use of hardware resources to execute communication manager application 140-1.

In accordance with different embodiments, note that computer system may be any of various types of devices, including, but not limited to, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 150 may reside at any location or can be included in any suitable resource in network environment 100 to implement functionality as discussed herein.

Note that any of the resources as discussed herein can include a processor and corresponding hardware storage medium that stores instructions to carry out embodiments herein. For example, each communication device 160, access point, server, etc., can be configured to include a processor, hardware data storage, etc., to carry functionality as discussed herein.

Functionality supported by the different resources will now be discussed via flowcharts in FIGS. 11-15. Note that the steps in the flowcharts below can be executed in any suitable order.

Figure 11:
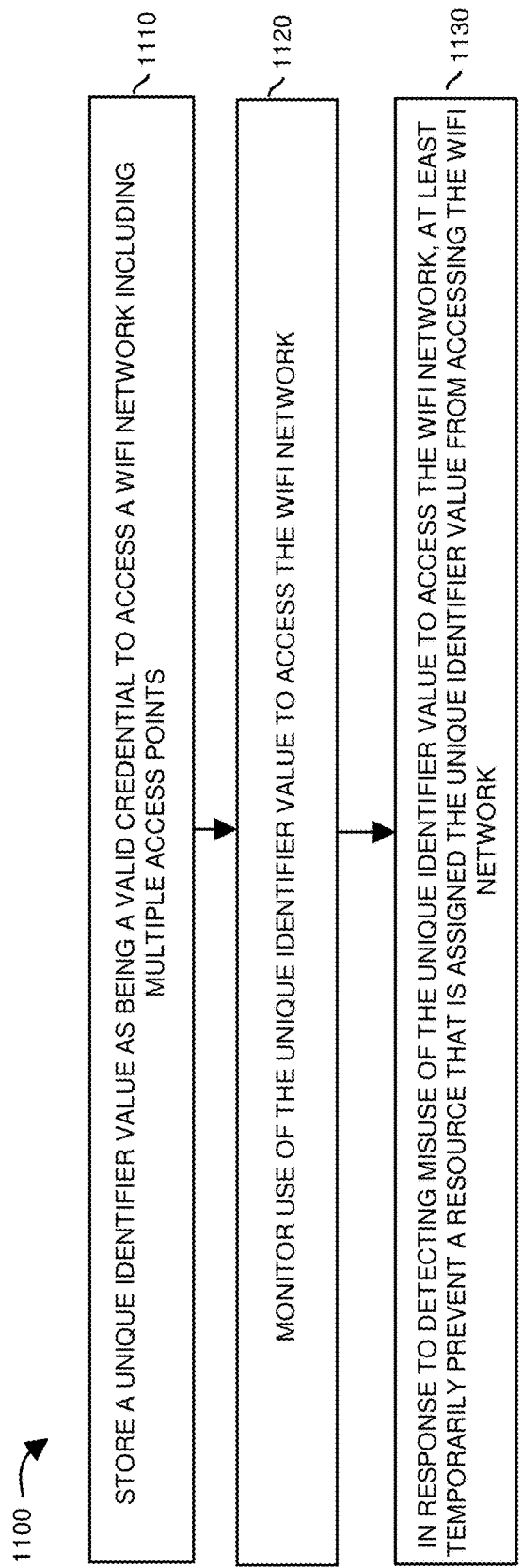
FIG. 11 is an example diagram illustrating a method of limiting access to a WiFi network and corresponding resources according to embodiments herein.

FIG. 11 is a flowchart 1100 illustrating an example method of controlling access to a network according to embodiments. Note that there will be some overlap with respect to concepts as discussed above.

In step 1110, the network manager 140 stores a unique identifier value as being a valid credential to access a WiFi network 191 including one or more access points.

In step 1120, the network manager 140 monitors use of the unique identifier value to access the WiFi network.

In step 1130, in response to detecting misuse of the unique identifier value to access the WiFi network, the network manager 140 at least temporarily prevents a resource that is assigned the unique identifier value from accessing the WiFi network.

Figure 12:
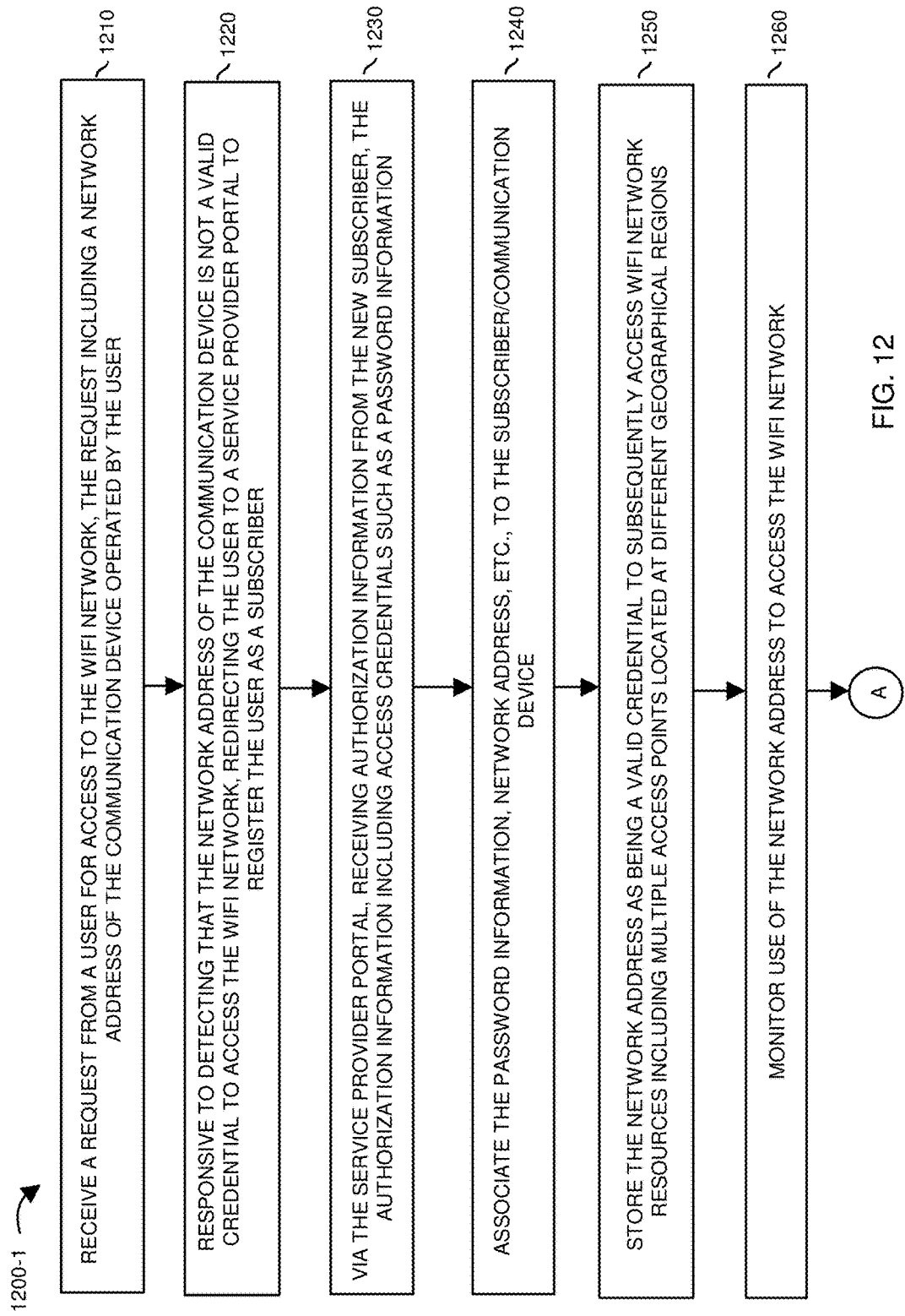
FIGS. 12 and 13 combine to form an example method of limiting access to a WiFi network and corresponding resources according to embodiments herein.
Figure 13:
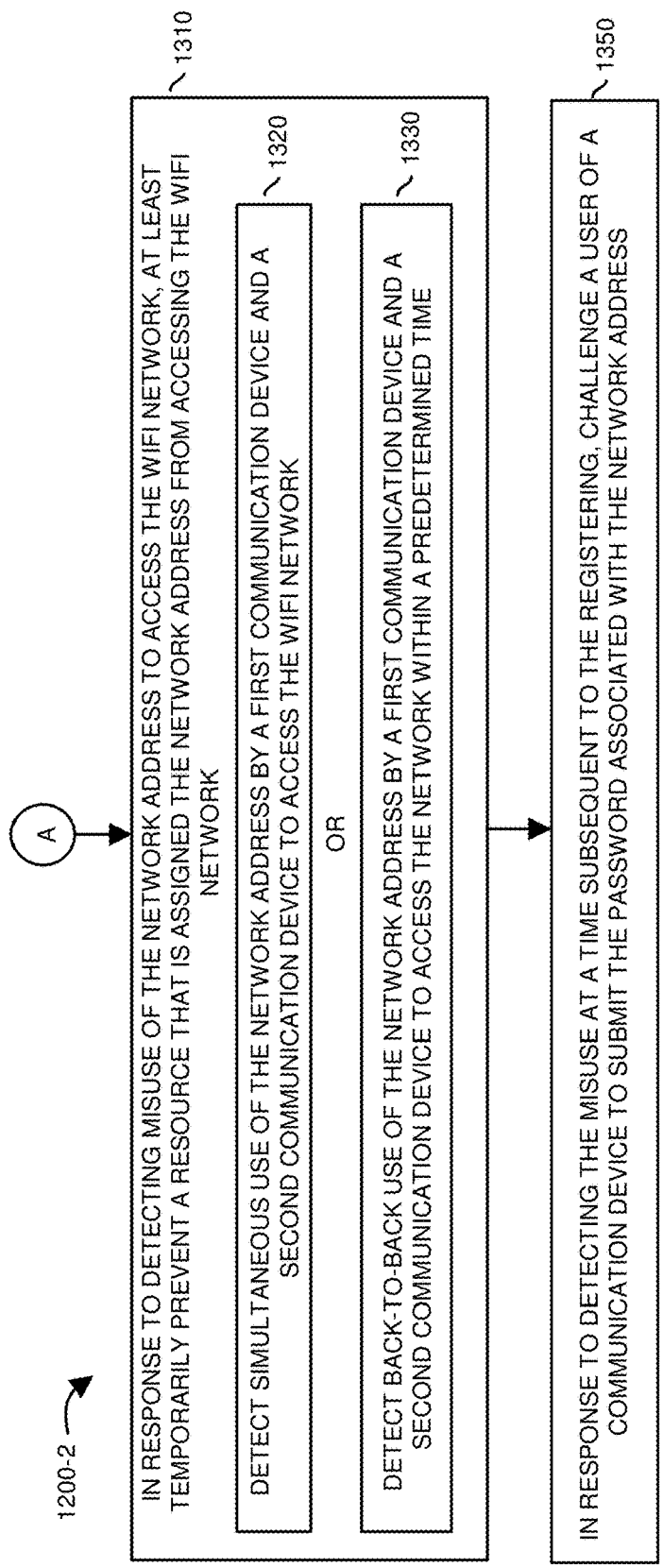

FIGS. 12 and 13 combine to form a flowchart 1200 (e.g., flowchart 1200-1 and flowchart 1200-2) illustrating an example method of providing access to a network according to embodiments herein. Note that there will be some overlap with respect to concepts as discussed above.

In step 1210, the access point 150-1 receives a request from a user 108-1 for access to a WiFi network 191-2. The request includes a network address 23790298 of the communication device 160-1 operated by the user 108-1.

In step 1220, responsive to detecting that the network address 23790298 of the communication device is currently not a valid credential to access the network 191-2, the access point 150-1 redirects the user (request) to a service provider portal to register the user 108-1 and/or communication device 160-1 as a subscriber.

In step 1230, via the service provider portal (e.g., registration server 141), the network manager 140 receives authorization information from the new subscriber. In one embodiment, the authorization information includes access credentials such as password information.

In step 1240, the network manager 140 associates the password information, network address, etc., to the user 108-1 and/or communication device 160-1.

In step 1250, the network manager 140 stores the network address 23790298 as being a valid credential to subsequently access (e.g., use) resources associated with network 191 including multiple access points and networks located at different geographical regions.

In step 1260, the network manager 140 monitors use of the network address 23790298 to access the WiFi network 191 at each of multiple locations.

In step 1310 of flowchart 1200-2 in FIG. 13, in response to detecting misuse of the network address 23790298, the network manager 140 and/or access point at least temporarily prevents a resource that is assigned the network address from accessing the network 191.

In sub-step 1320, an access point detects simultaneous use of the network address by a first communication device and a second communication device to access the WiFi network. As an alternative to sub-step 1310, the network manager and/or access point detects back-to-back use of the network address by a first communication device and a second communication device to access the network within a predetermined time as calculated from graph 700.

In step 1340, in response to detecting the misuse at a time subsequent to the registering, the network manager 140 and/or access point challenges a user of the communication device to submit appropriate password information.

Figure 14:
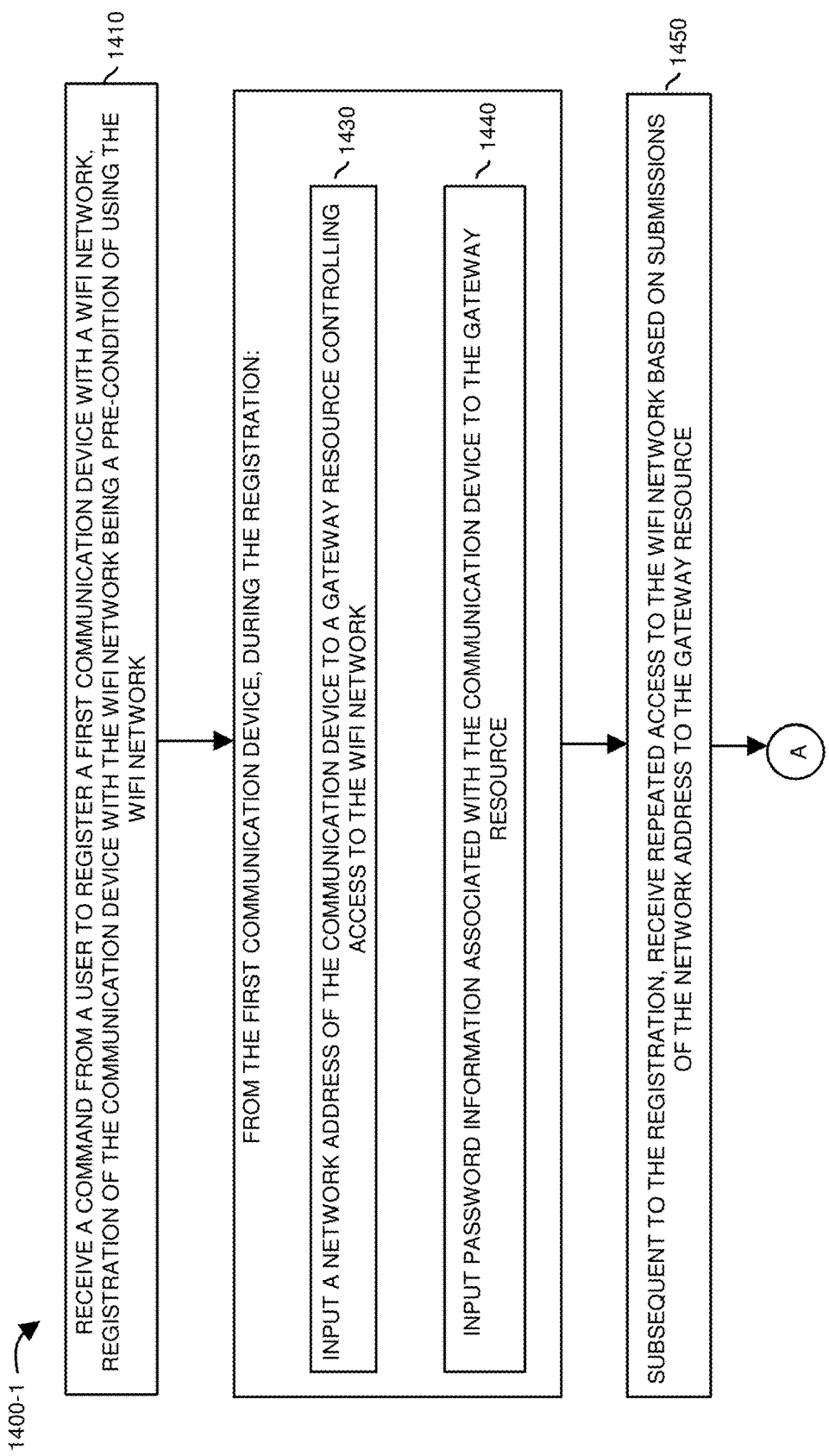
FIGS. 14 and 15 combine to form an example method of limiting access to a WiFi network and corresponding resources according to embodiments herein.
Figure 15:
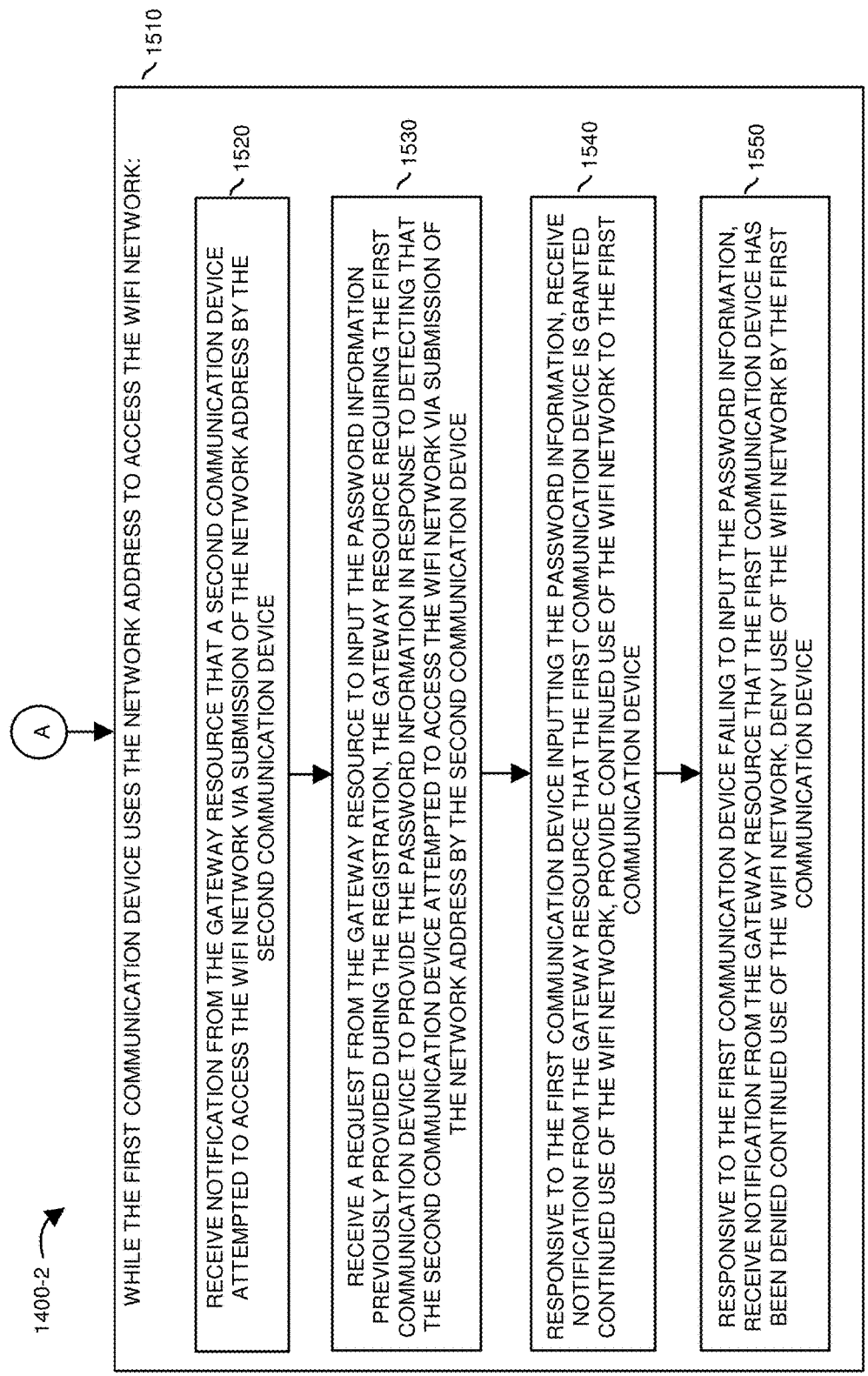

FIGS. 14 and 15 combine to form a flowchart 1400 (e.g., flowchart 1400-1 and flowchart 1400-2) illustrating an example method of obtaining network access according to embodiments herein. Note that there will be some overlap with respect to concepts as discussed above.

In step 1410, the communication device 160-1 receives a command from a user to register communication device 160-1 for use of network 191. Registration of the communication device 160-1 is a pre-condition to the communication device 160-1 using the network 191.

From the communication device, and during the registration:

In step 1430, the communication device 160-1 inputs a network address 23790298 of the communication device 160-1 through an access point to gateway manager 142 controlling access to the network 191.

In step 1440, the communication device 160-1 inputs password information (e.g., SUPER12345) associated with the communication device 160-1 to the gateway manager 142.

In step 1450, subsequent to the registration, the communication device 160-1 receives repeated access (e.g., via respective communication sessions) to different locations of the network 191 based on submissions of the network address 23790298 to the gateway manager 142.

In step 1510, while the first communication device 160-1 uses the network address 23790298 to access the network 191:

In step 1520, the communication device 160-1 or respective access point receives notification from the gateway manager 142 that a second communication device 160-X attempted to access the network 191 via submission of the network address 23790298 by the second communication device 160-X.

In step 1530, the communication device 160-1 receives a request from the gateway manager 142 to input password information previously provided during the registration. The gateway manager 142 requires the first communication device 160-1 to provide the password information in response to detecting that the second communication device 160-X attempts to access the network 191 via submission of the network address 23790298 by the second communication device 160-X.

In step 1540, responsive to the first communication device 160-1 inputting the password information, the user of communication device 160-1 receives notification from the gateway manager 142 through a respective access point that the first communication device 160-1 is granted continued use of the network 191. In other words, the gateway manager 142 provides continued use of the network 191 to the first communication device 160-1 because it appears to be a valid subscriber.

As an alternative to step 1540, in step 1550, responsive to the first communication device failing to input the password information, the communication device 160-1 receives notification from the gateway manager 142 that the first communication device 160-1 has been denied continued use of the network 191.

Note again that techniques herein are well suited for selectively providing access to a WiFi network. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:
1. A method comprising:
via computer processor hardware, performing operations of:
detecting first use of a network address to establish a first communication session with a first wireless access point;
subsequent to termination of the first communication session, detecting second use of the network address to establish a second communication session over a second wireless access point;
in response to detecting that the second use of the network address occurs within a threshold amount of time following the termination of the first communication session, denying the second communication session and corresponding use of the second wireless access point; and
wherein a magnitude of the threshold amount of time is derived based on a distance between the first wireless access point and the second wireless access point.

2. The method as in claim 1 further comprising:
detecting non-simultaneous use of the network address by a first communication device and a second communication device, the first communication device using the network address to establish the first communication session with the first wireless access point, the second communication device attempting to use the network address to establish the second communication session with the second wireless access point.

3. The method as in claim 2 further comprising:
providing a notification to an operator of the first communication device that the second communication device attempted to use the network address to establish the second communication session.

4. The method as in claim 1, wherein denying the second communication session further comprises:
calculating a time difference between the termination of the first communication session and a beginning of the second communication session; and
detecting that the time difference is less than the threshold amount of time.

5. The method as in claim 1 further comprising:
detecting the first use based on a first communication device supplying the network address to the first wireless access point to establish the first communication session over the first wireless network; and
detecting the second use based on a second communication device supplying the network address to the second wireless access point to establish the second communication session over the second wireless network.

6. The method as in claim 1 further comprising:
storing the network address as being a valid credential to access the wireless network, the network address received from a communication device operated by a subscriber during registration of the subscriber to use a wireless network including the first wireless access point and the second wireless access point.

7. The method as in claim 1, wherein a first communication device uses the network address to establish the first communication session; and
wherein a second communication device uses the network address to establish the second communication session.

8. The method as in claim 7, wherein the first wireless access point and the second wireless access point both are part of a service provider's wireless network providing access to the Internet.

9. The method as in claim 1 further comprising:
in response to detecting the second use of network address within the threshold amount of time of the first communication session being terminated:
challenging a resource attempting to establish the second communication session to submit a credentials; and
providing the resource access to the wireless network in response to detecting that the resource submits an appropriate password associated with the network address.

10. The method as in claim 1, wherein the threshold amount of time is based on a travel time of a user operating a communication device assigned the network address.

11. The method as in claim 1 further comprising:
challenging a user of a communication device assigned the network address to submit a password; and
in response to receiving the password, providing the communication device use of the first communication session in response to detecting that the user submits an appropriate password.

12. The method as in claim 1, wherein detecting first use of the network address to establish the first communication session with the first wireless access point includes: receiving the network address from a first communication device requesting to establish the first communication session with the first wireless access point; and
wherein detecting second use of the network address to establish the second communication session over the second wireless access point includes: receiving the network address from a second communication device requesting to establish the second communication session with the second wireless access point.

13. A method comprising:
via computer processor hardware, performing operations of:
detecting first use of a network address to establish a first communication session with a first wireless access point;
subsequent to termination of the first communication session, detecting second use of the network address to establish a second communication session over a second wireless access point; and
in response to detecting that the second use of the network address occurs within a threshold amount of time following the termination of the first communication session, denying the second communication session and corresponding use of the second wireless access point;
the method further comprising: preventing use of the network address to establish a communication session until after the threshold amount of time has passed with respect to the termination of the first communication session, the magnitude of the threshold amount of time derived based on a estimated distance between the first wireless access point and the second wireless access point.

14. A computer system comprising:
computer processor hardware; and
a hardware storage resource in communication with the computer processor hardware, the hardware storage resource storing instructions that, when executed by the computer processor hardware device, cause the computer processor hardware to:
detect first use of a network address to establish a first communication session using a first wireless access point;
subsequent to termination of the first communication session, detect second use of the network address to establish a second communication session over a second wireless access point; and
in response to detection that the second use of the network address occurs within a threshold amount of time following the termination of the first communication session, deny the second communication session and corresponding use of the second wireless access point; and
wherein the threshold amount of time is derived based at least in part on a distance between the first wireless access point and the second wireless access point.

15. The computer system as in claim 14, wherein the instructions, when executed, further cause the computer processor hardware to:
detect non-simultaneous use of the network address by a first communication device and a second communication device, the first communication device using the network address to establish the first communication session with the first wireless network, the second communication device attempting to use the network address to establish the second communication session with the second wireless network.

16. The computer system as in claim 15, wherein the instructions, when executed, further cause the computer processor hardware to:
provide a notification to an operator of the first communication device that the second communication device attempted to use the network address to establish the second communication session.

17. The computer system as in claim 14, wherein the instructions, when executed, further cause the computer processor hardware to:
prevent use of the network address to establish a communication session until after the threshold amount of time has passed with respect to the termination of the first communication session, the magnitude of the threshold amount of time derived based on a distance between the first wireless access point and the second wireless access point.

18. The computer system as in claim 14, wherein the instructions, when executed, further cause the computer processor hardware to:
calculate a time difference between occurrence of the termination of the first communication session and a beginning of the second communication session; and
detect that the time difference is less than the threshold amount of time.

19. The computer system as in claim 14, wherein the instructions, when executed, further cause the computer processor hardware to:
- detect the first use based on a first communication device supplying the network address to the first wireless access point to establish the first communication session over the first wireless network; and
- detect the second use based on a second communication device supplying the network address to the second wireless access point to establish the second communication session over the second wireless network.

20. The computer system as in claim 14, wherein the instructions, when executed, further cause the computer processor hardware to:
- store the network address as being a valid credential to access the wireless network, the network address received from a communication device operated by a subscriber during registration of the subscriber to use a wireless network including the first wireless access point and the second wireless access point.

21. The computer system as in claim 14, wherein a first communication device uses the network address to establish the first communication session; and
- wherein a second communication device uses the network address to establish the second communication session.

22. The computer system as in claim 21, wherein the first wireless access point and the second wireless access point both are part of a service provider's wireless network providing access to the Internet.

23. Computer-readable storage hardware having instructions stored thereon, the instructions, when carried out by computer processor hardware, cause the computer processor hardware to:
- detect first use of a network address to establish a first communication session with a first wireless access point;
- subsequent to termination of the first communication session, detect second use of the network address to establish a second communication session over a second wireless access point; and
- in response to detecting that the second use of the network address occurs within a threshold amount of time following the termination of the first communication session, deny the second communication session and corresponding use of the second wireless access point; and
- wherein the threshold amount of time is derived based on a time in which the user is able to travel from one geographical location to another.

24. A method comprising:
via computer processor hardware, performing operations of:
- detecting first use of a network address to establish a first communication session with a first wireless access point;
- subsequent to termination of the first communication session, detecting second use of the network address to establish a second communication session over a second wireless access point; and
- in response to detecting that the second use of the network address occurs within a threshold amount of time following the termination of the first communication session, denying the second communication session and corresponding use of the second wireless access point; and
- wherein the threshold amount of time is derived based on a time in which the user is able to travel from one geographical location to another.

* * * * *